(12) United States Patent
Liang et al.

(10) Patent No.: US 11,005,105 B2
(45) Date of Patent: *May 11, 2021

(54) CURRENT COLLECTOR, ELECTRODE PLATE AND ELECTROCHEMICAL DEVICE

(71) Applicant: Contemporary Amperex Technology Co., Limited, Ningde (CN)

(72) Inventors: Chengdu Liang, Ningde (CN); Huafeng Huang, Ningde (CN); Qisen Huang, Ningde (CN); Xin Liu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,713

(22) Filed: Apr. 19, 2019

(65) Prior Publication Data

US 2020/0106106 A1    Apr. 2, 2020

(30) Foreign Application Priority Data

Sep. 30, 2018   (CN) .......................... 201811158482.8

(51) Int. Cl.
*H01M 4/66* (2006.01)
*H01M 4/74* (2006.01)
*H01M 4/02* (2006.01)

(52) U.S. Cl.
CPC .......... *H01M 4/742* (2013.01); *H01M 4/662* (2013.01); *H01M 4/663* (2013.01); *H01M 4/667* (2013.01);

(Continued)

(58) Field of Classification Search
CPC ............................. H01M 4/742; H01M 4/667
See application file for complete search history.

(56) References Cited

U.S. PATENT DOCUMENTS

| 2004/0126663 A1* | 7/2004 | Sudano | ................. | H01M 4/668 429/234 |
| 2012/0052378 A1* | 3/2012 | Torata | ................... | H01M 4/668 429/209 |

(Continued)

FOREIGN PATENT DOCUMENTS

| CN | 1780714 A | 5/2006 |
| CN | 106711462 A | 5/2017 |

(Continued)

OTHER PUBLICATIONS

Extended European Search Report in corresponding European Patent Application No. 19169779.6, dated Oct. 17 2019, 6 pages.

(Continued)

*Primary Examiner* — Wyatt P McConnell
(74) *Attorney, Agent, or Firm* — Christensen O'Connor Johnson Kindness PLLC

(57) ABSTRACT

The present disclosure relates to the technical field of battery, and in particular, relates to a current collector, an electrode plate and an electrochemical device. The current collector includes an insulation layer; a conductive layer located on at least one surface of the insulation layer; and a first protective layer provided on a surface of the conductive layer facing away from the insulation layer. The first protective layer is made of a metal. The current collector is provided with a plurality of holes penetrating through the insulation layer, the conductive layer and the first protective layer.

18 Claims, 2 Drawing Sheets

(52) U.S. Cl.
 CPC .......... *H01M 2004/021* (2013.01); *H01M 2004/025* (2013.01)

(56) References Cited

U.S. PATENT DOCUMENTS

2012/0315537 A1* 12/2012 Ravdel .............. H01M 4/668
                                                    429/209
2018/0301709 A1* 10/2018 Qiu ................ C23C 14/568

FOREIGN PATENT DOCUMENTS

| | | | | |
|---|---|---|---|---|
| CN | 107369810 A | 11/2017 | | |
| CN | 206849947 U | 1/2018 | | |
| CN | 108281662 A | 7/2018 | | |
| JP | 928922 A | 2/1997 | | |
| JP | 10241699 A | 9/1998 | | |
| JP | H10241699 | * | 9/1998 | ............ H01M 10/05 |
| JP | 2016155939 | * | 9/2016 | ............. B29C 65/16 |

OTHER PUBLICATIONS

Notice of Refusal in corresponding Japanese Patent Application No. 2019014971, dated Feb. 4, 2020, 9 pages.
First Chinese Office Action, dated Jul. 24, 2020, issued in corresponding Chinese Application No. 201811158482.8, filed Sep. 30, 2018, 15 pages.
Second Chinese Office Action, dated Nov. 11, 2020, issued in corresponding Chinese Application No. 201811158482.8, filed Sep. 30, 2018, 18 pages.

* cited by examiner

CURRENT COLLECTOR, ELECTRODE PLATE AND ELECTROCHEMICAL DEVICE

CROSS-REFERENCE TO RELATED APPLICATIONS

The present application claims priority to Chinese Patent Application No. CN201811158482.8, filed on Sep. 30, 2018, the content of which is incorporated herein by reference in its entirety.

TECHNICAL FIELD

The present disclosure relates to the technical field of battery, and in particular, relates to a current collector, an electrode plate, and an electrochemical device.

BACKGROUND

Lithium ion batteries have been widely used in electric vehicles and consumer electronics due to their advantages such as high energy density, high output power, long cycle life, and low environmental pollution. With continuous increase of the application range of lithium ion batteries, requirements for weight energy density and volume energy density of lithium ion batteries are also increasing.

In order to obtain a lithium ion battery with the high weight energy density and volume energy density, the lithium ion battery is generally improved by: (1) selecting a positive or negative electrode material having a high specific discharge capacity; (2) optimizing the mechanical design of the lithium ion battery to minimize its volume; (3) selecting a positive or negative electrode plate having the high compaction density; and (4) reducing weight of various parts of the lithium ion battery.

The current collector is generally improved by selecting a lighter or thinner current collector such as a plastic current collector coated with a metal layer, etc.

For the plastic current collector coated with a metal layer, improvements on many aspects are needed so as to obtain a current collector with good conductivity, a light weight, and a small thickness.

In view of this, the present disclosure is proposed.

SUMMARY

The present disclosure provides a current collector, which has good conductivity, a good mechanical stability, a high weight energy density and good mechanical strength. The current collector includes: an insulation layer; a conductive layer at least located on at least one surface of the insulation layer; and a first protective layer provided on a surface of the conductive layer facing away from the insulation layer. The first protective layer is made of a metal. The current collector is provided with a plurality of holes penetrating through the insulation layer, the conductive layer and the first protective layer.

A second aspect of the present disclosure provides an electrode plate including the current collector according to the first aspect and an electrode active material layer at least formed on a surface of the current collector.

A third aspect of the present disclosure provides an electrochemical device including a positive electrode plate, a separator, and a negative electrode plate. The positive electrode plate and/or the negative electrode plate is the electrode plate according to the second aspect.

The technical solutions of the present disclosure have at least the following beneficial effects.

The current collector of the present disclosure is light relative to a conventional current collector, so that the weight energy density of the battery can be effectively increased, thereby obtaining a light-weight current collector. The light-weight current collector of the present disclosure further has good mechanical strength and conductivity, so that the current collector has a good mechanical stability, a good long-term reliability, a good service life, and a good rate performance. On the other hand, the protective layer in the current collector according to the present disclosure can increase the mechanical strength of the conductive layer, prevent the conductive layer from being damaged, oxidized or corroded, etc., and thus significantly improve conductivity, long-term reliability and service life of the current collector.

Moreover, providing the plurality of holes penetrating through the insulation layer and the conductive layer can facilitate electrolyte passing through and improve wettability of electrolyte of electrodes of the current collector, thereby reducing polarization of the electrodes and the battery and improving electrochemical properties of the battery such as properties of charge-discharge at high rate and cycle life. Moreover, providing the plurality of holes in the current collector can further reduce the weight of the current collector and increase the weight energy density of the battery.

The electrode plate and the electrochemical device according to the present disclosure can have a high weight energy density, good electrochemical properties such as properties of charge-discharge at high rate and cycle life, and excellent long-term reliability and service life.

Further, the light transmittance T of the insulation layer satisfies: $0 \leq T \leq 98\%$, preferably $15\% \leq T \leq 95\%$, and more preferably $15\% \leq T \leq 90\%$. In view of this, it is possible to improve the absorption efficiency of the insulation layer for laser light, thereby improving the processability of the current collector when laser cutting is performed in forming the holes.

REFERENCE NUMERALS

Figure 1:
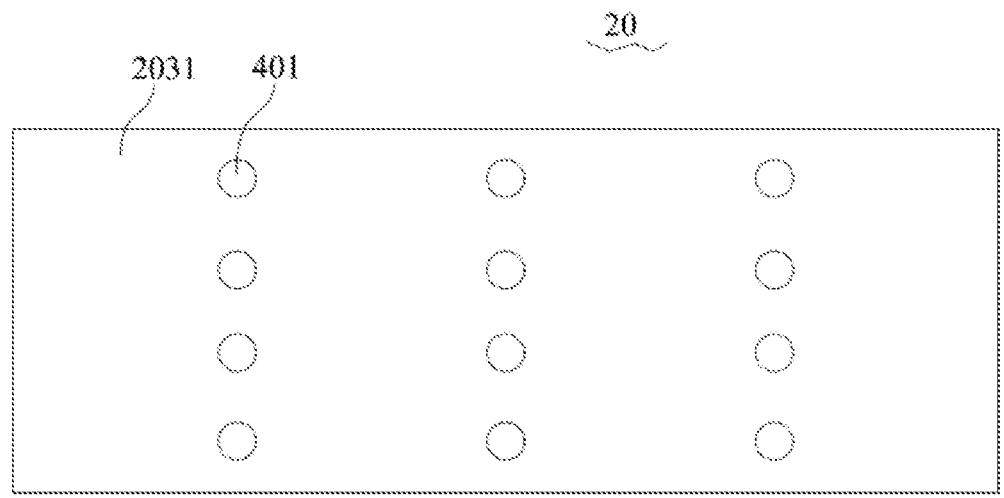
FIG. 1 is a top view of a negative current collector according to an embodiment of the present disclosure.

1—positive electrode plate;
  10—positive current collector;
    101—positive insulation layer;

102—positive conductive layer;
1031—first protective layer;
1032—second protective layer
11—positive active material layer;
201—hole;
2—negative electrode plate;
20—negative current collector;
201—negative insulation layer;
202—negative conductive layer;
2031—first protective layer;
2032—second protective layer;
21—negative active material layer;
401—hole.

DESCRIPTION OF EMBODIMENTS

The present disclosure is further described below by means of embodiments. It should be understood that these embodiments are merely used for illustrating the present disclosure, but not intended to limit the present disclosure.

The present disclosure relates to a current collector. The current collector includes an insulation layer and a conductive layer at least located on at least one surface of the insulation layer. The current collector further includes a first protective layer provided on a surface of the conductive layer facing away from the insulation layer. The first protective layer is made of a metal. The current collector is provided with a plurality of holes penetrating through the insulation layer, the conductive layer and the first protective layer.

The current collector of the present disclosure is light relative to a conventional current collector (e.g., a negative current collector of a copper foil or a positive current of an aluminum foil), so that the weight energy density of the battery can be effectively improved, thereby obtaining a light-weight current collector. The light-weight current collector of the present disclosure further has good mechanical strength and conductivity, so that the current collector has a good mechanical stability, a good long-term reliability, a good service life, and a good rate performance. On the other hand, the protective layer in the current collector according to the present disclosure can increase the mechanical strength of the conductive layer, prevent the conductive layer from being damaged, oxidized or corroded, etc., and thus significantly improve a long-term reliability and a service life of the current collector. Further, providing the current collector with the plurality of holes penetrating through the insulation layer and the conductive layer can facilitate stress relief of the conductive layer, which can greatly improve a binding force between the conductive layer and the insulation layer, facilitate the electrolyte passing through, and improve wettability of the electrolyte based on electrodes of the current collector, thereby reducing polarization of the electrodes and the battery and improving electrochemical properties of the battery such as properties of charge-discharge at high rate and cycle life. Moreover, providing the plurality of holes in the current collector can further reduce the weight of the current collector and increase the weight energy density of the battery.

As an example, the conductive layer may be also located on wall surfaces of the plurality of holes, and for each of the plurality of holes having the conductive layer disposed on its wall surface, the conductive layer is located on an entirety or a part of the wall surface of the hole. Preferably, a part of the conductive layer located on the at least one surface of the insulation layer is partially or entirely connected to a part of the conductive layer located on the wall surfaces of the holes. Preferably, the conductive layer is disposed on the upper surface and the lower surface of the insulation layer, and a part of the conductive layer located on the upper surface and the lower surface of the insulation layer is partially or entirely connected to the part of the conductive layer located on the wall surfaces of the holes. Preferably, the conductive layer is not only located on at least one surface of the insulation layer, but also located on the wall surfaces of the plurality of holes. Therefore, the conductive layer firmly "grips" the insulation layer from the at least one surface of the insulation layer and the plurality of holes. The bonding between the insulation layer and the conductive layer is not limited to the plane direction, but also the depth direction, which can strengthen the bonding force between the conductive layer and the insulation layer, thereby improving the long-term reliability and service life of the current collector. In the current collector, since the insulation is non-conductive, the conductive property becomes a "let-down" of the composite current collector. By providing the conductive layer on at least one surface of the insulation layer and the wall surfaces of the plurality of holes, a three-dimensional conductive network having multiple point positions can be formed in the current collector. This can greatly improve the conductivity property of the composite current collector, reduce the polarization of the electrode plate and the battery, and improve electrochemical properties of the battery such as properties of charge-discharge at high rate and cycle life. In addition, the special perforation design can allow electrons in the conductive layer on two surfaces of the insulation layer to "converge" together, thereby avoiding a design in which it is required to arrange separate current leads coming out of the two conductive layers.

It should be understood that the part of the conductive layer located on the wall surfaces of the plurality of holes and the part of the conductive layer located on the at least one surface of the insulation layer may have the same thickness or different thicknesses, and may be made of a same material or different materials. For each of the plurality of holes having the conductive layer disposed on its wall surface, the conductive layer is located on an entirety or a part of the wall surface, preferably on an entirety of the wall surface. As an example, a part of the conductive layer located on at least one surface of the insulation layer is connected to a part of the conductive layer located on the wall surfaces of the holes.

The holes have an aperture in a range from 0.001 mm to 3 mm. In this range, not only the effects of improving safety and polarization can be achieved, but also it is easier to process the current collector and breakage and the like is unlikely to occur during the processing.

An area ratio of the holes to an entire surface of the conductive layer disposed on one surface of the insulation layer is 0.1% to 30%. Within this range, not only the effects of improving safety and polarization can be achieved, but also it is easier to process the current collector, and a breakage and the like is unlikely to occur during the processing.

A spacing between two of the holes is in a range from 0.2 mm to 5 mm. The holes may be equally spaced apart from one another or can be in a multi-pitch distribution within the range. As an example, the holes are equally spaced apart from one another.

The shape of the hole may be one of a parallelogram, a parallel-like quadrilateral, a circle, a circle-like, an ellipse, and an ellipse-like shape. The protective layer arranged on a surface of the conductive layer facing away from the insulation layer (i.e., the upper surface of the conductive layer) is a first protective layer. The first protective layer is made of a metal. The metal may be selected from a group consisting of nickel, chromium, nickel-based alloy (such as nickel-chromium alloy), copper-based alloy (such as copper-nickel alloy), and combinations thereof. The nickel-chromium alloy is an alloy made of a metal nickel and a metal chromium. In an example, the mole ratio of nickel element to chromium element is 1:99 to 99:1. The first protective layer made of a metal material not only further improves the mechanical strength and corrosion resistance of the conductive layer, but also reduces the polarization of the electrode plate. In particular, when the current collector according to the embodiment of the present disclosure is a negative current collector, since the first protective layer made of a metal has good conductivity, it can better provide electrons to the electrode active material layer in contact with it, thereby reducing polarization in the electrode active material layer, improving the electrochemical properties of the battery and preventing lithium from being precipitated and the like.

Preferably, the current collector further includes a second protective layer. The protective layer arranged on a surface of the conductive layer facing towards the insulation layer (i.e., the lower surface of the conductive layer) is the second protective layer. The second protective layer may be made of a metal, a metal oxide, or a conductive carbon. The metal may be preferably selected from a group consisting of nickel, chromium, nickel-based alloy, copper-based alloy, and combinations thereof. The metal oxide may be selected from a group consisting of aluminum oxide, cobalt oxide, chromium oxide, nickel oxide and combinations thereof. The conductive carbon may be selected from a group consisting of conductive carbon black, carbon nanotubes, acetylene black, graphene, or combinations thereof. The second protective layer may be preferably made of the metal.

The second protective layer together with the first protective layer can form a complete supporting structure to protect the conductive layer, thereby better protecting the conductive layer and preventing the conductive layer from being oxidized, corroded or damaged. Moreover, the second protective layer can also improve the bonding force between the insulation layer and the conductive layer, thereby improving the mechanical strength of the current collector.

Due to the good conductivity property, mechanical strength and corrosion resistance of the metal material, the second protective layer made of the metal material can not only further improve the mechanical strength and corrosion resistance of the conductive layer, but also reduce the polarization of the electrode plate.

Especially when the current collector according to the embodiment of the present disclosure is a negative current collector, the first protective layer made of the metal and the second protective layer made of the metal may better provide electrons to the electrode active material lay in contact therewith due to the good conductivity property of the metal, thereby reducing polarization in the electrode active material layer, improving the electrochemical properties of the battery, and preventing lithium from being precipitated and the like.

Further, the first protective layer has a thickness of $D3$, where $D3 \leq 0.1D2$ and $1\ nm \leq D3 \leq 200\ nm$. Preferably, $10\ nm \leq D3 \leq 50\ nm$. The second protective layer has a thickness of $D3'$, where $D3' \leq 0.1D2$ and $1 \leq D3' \leq 200\ nm$. Preferably, $10\ nm \leq D3' \leq 50\ nm$.

Further, the thickness of the first protective layer is greater than the thickness of the second protective layer. That is, a thickness of a protective layer disposed on one surface of the conductive layer facing away from the insulation layer is greater than a thickness of a protective layer disposed on one surface of the conductive layer facing towards the insulation layer.

The thickness of the second protective layer can be minimized, so as to increase the weight energy density of the battery, as long as the second protective layer is thick enough to protect the conductive layer.

Further, as an example, a relationship between the thickness $D3'$ of the second protective layer and the thickness $D3$ of the first protective layer is: $0.5D3 \leq D3' \leq 0.8D3$. An increased thickness of the second protective layer has a limited improvement on the safety performance of the battery, but may affect the weight energy density of the battery.

Insulation Layer

In the current collector according to the embodiments of the present disclosure, the insulation layer mainly serves to support and protect the conductive layer and has a thickness of $D1$, where $1\ \mu m \leq D1 \leq 20\ \mu m$. The insulation layer within such range can lead to the better processing performance without reducing a volume energy density of the battery adopting this current collector.

An upper limit of the thickness $D1$ of the insulation layer may be $20\ \mu m$, $15\ \mu m$, $12\ \mu m$, $10\ \mu m$, or $8\ \mu m$. A lower limit of the thickness $D1$ of the insulation layer may be $1\ \mu m$, $1.5\ \mu m$, $2\ \mu m$, $3\ \mu m$, $4\ \mu m$, $5\ \mu m$, $6\ \mu m$, or $7\ \mu m$. The thickness $D1$ of the insulation layer is in a range consisting of any one upper limit and any one lower limit, preferably, $2\ \mu m \leq D1 \leq 10\ \mu m$, and more preferably, $2\ \mu m \leq D1 \leq 6\ \mu m$.

The insulation layer is made of a material selected from a group consisting of an organic polymer insulation material, an inorganic insulation material, a composite material, and combinations thereof. Preferably, the composite material includes an organic polymer insulation material and an inorganic insulation material.

The organic polymer insulation material is selected from a group consisting of polyamide (abbreviated as PA), polyethylene terephthalate (abbreviated as PET), polyimide (abbreviated as PI), polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, poly polyformaldehyde (abbreviated as POM), phenol-formaldehyde resin, ethylene propylene rubber (abbreviated as PPE), polytetrafluoroethylene (abbreviated as PTFE), silicone rubber, polyvinylidene fluoride (abbreviated as PVDF), polycarbonate (abbreviated as PC), aramid fiber, polydiformylphenylenediamine, cellulose and derivatives thereof, starch and derivatives thereof, proteins and derivatives thereof, polyvinyl alcohol and crosslinked products thereof, polyethylene glycol and crosslinked products thereof, and combinations thereof.

The inorganic polymer insulation material is selected from a group consisting of $Al_2O_3$, $SiC$, $SiO_2$, and combinations thereof.

The composite material is preferably selected from a group consisting of an epoxy resin glass fiber reinforced composite material, a polyester resin glass fiber reinforced composite material, and combinations thereof.

Preferably, the material of the insulation layer is selected from the organic polymer insulation materials. Since the insulation layer usually has a smaller density than the metal, the current collector according to the present disclosure can improve the weight energy density of the battery while improving the safety performance of the battery. In addition, since the insulation layer can well support and protect the conductive layer located on the surface thereof, a breakage of the electrode, which is common in the conventional current collector, is unlikely to occur.

In order to provide a plurality of holes penetrating through the insulation layer, the conductive layer and the first protective layer in the current collector according to the present disclosure, it is necessary to form a structure having a plurality of holes in the insulation layer in some way, for example Laser Drilling. When the polymer material or the polymer composite material is treated by the laser method, it is possible for the insulation layer made of such material to become sticky and the cutting efficiency is low. Moreover, the increase of the laser power may cause the conductive layer to burn and the insulation layer to melt.

Therefore, preferably, the light transmittance T of the insulation layer satisfies: $0 \leq T \leq 98\%$, preferably $15\% \leq T \leq 95\%$, and more preferably $15\% \leq T \leq 90\%$. Satisfying the above light transmittance can improve the absorption rate of the insulation layer for the laser energy, thereby leading to high processability and processing efficiency in laser cutting processing, especially high processability and processing efficiency in low power laser cutting processing. The laser power in the laser cutting processing may be, for example, smaller than or equal to 100 W.

A colorant for adjusting light transmittance can be added in the insulation layer, and then the light transmittance of the insulation layer can be adjusted by adjusting the content of the colorant.

The colorant may cause the insulation layer to exhibit a certain degree of black, blue or red, but is not limited thereto. For example, the colorant may cause the insulation layer to exhibit a certain degree of yellow, green, purple, etc.

The colorant may be one or more of an inorganic pigment and an organic pigment.

The inorganic pigment is, for example, one or more of carbon black, cobalt blue, ultramarine blue, iron oxide, cadmium red, chrome orange, molybdenum orange, cadmium yellow, chrome yellow, nickel titanium yellow, titanium white, zinc antimony white, and zinc white.

The organic pigment may be one or more of a phthalocyanine pigment, an azo pigment, an anthraquinone pigment, an indigo pigment, and a metal complex pigment. As an example, the organic pigment may be one or more of plastic red GR, plastic purple RL, light fast yellow G, permanent yellow, rubber red LC, phthalocyanine blue, and phthalocyanine green.

Preferably, the thickness D1 of the insulation layer and the light transmittance T of the insulation layer satisfy:

if $12 \ \mu m \leq D1 \leq 30 \ \mu m$, $30\% \leq T \leq 80\%$; and/or,
if $8 \ \mu m \leq D1 \leq 12 \ \mu m$, $40\% \leq T \leq 90\%$; and/or,
if $1 \ \mu m \leq D1 \leq 8 \ \mu m$, $50\% \leq T \leq 98\%$.

Conductive Layer

In the current collector according to the embodiments of the present disclosure, the conductive layer has a thickness of D2, where $30 \ nm \leq D2 \leq 3 \ \mu m$, preferably, $300 \ nm \leq D2 \leq 2 \ \mu m$. The conductive layer in this range has better conductivity and does not reduce the weight energy density and volume energy density of the battery.

The conductive layer is made of a material selected from a group consisting of a metal conductive material, a carbon-based conductive material, and combinations thereof. The metal conductive material is preferably selected from a group consisting of aluminum, copper, nickel, titanium, silver, nickel-copper alloy, aluminum-zirconium alloy, and combinations thereof. The carbon-based conductive material is preferably selected from a group consisting of graphite, acetylene black, graphene, carbon nanotubes, and combinations thereof.

An upper limit of the thickness D2 of the conductive layer may be 3 µm, 2.8 µm, 2.5 µm, 2.3 µm, 2 µm, 1.8 µm, 1.5 µm, 1.2 µm, 1 µm, or 900 nm. A lower limit of the thickness D2 of the conductive layer may be 800 nm, 700 nm, 600 nm, 500 nm, 450 nm, 400 nm, 350 nm, 300 nm, 250 nm, 200 nm, 150 nm, 100 nm or 30 nm. The thickness of the conductive layer is in a range consisting of any one upper limit and any one lower limit, preferably, $300 \ nm \leq D2 \leq 2 \ \mu m$, and more preferably, $500 \ nm \leq D2 \leq 1.5 \ \mu m$.

Since the density of the conductive layer is greater than the density of the insulation layer, the smaller thickness D2 of the conductive layer can be more conductive to reducing the weight of the negative current collector and improving the energy density of the battery. However, if D2 is too small, the current conductive and current collecting effects of the conductive layer are deteriorated, which may affect the internal resistance, polarization, and cycle life of the battery. Therefore, when the thickness of the conductive layer satisfies $30 \ nm \leq D2 \leq 3 \ \mu m$, the conductive layer can effectively reduce the weight of the current collector, and can also lead to the better rate performance, charging and discharging performance and the like for the battery. Preferably, $300 \ nm \leq D2 \leq 2 \ \mu m$, and more preferably, $500 \ nm \leq D2 \leq 1.5 \ \mu m$.

The conductive layer can formed on the insulation layer by means of at least one of vapor deposition and electroless plating. With respect to the vapor deposition, physical vapor deposition (PVD) is preferable. Preferably, the physical vapor deposition is at least one of evaporation deposition and sputtering deposition. As regards the evaporation deposition, at least one of vacuum evaporation, thermal evaporation deposition, electron beam evaporation method (EBEM) is preferable. As regards the sputtering deposition, magnetron sputtering is preferable.

The conductive layer may be located not only on at least one surface of the insulation layer but also on wall surfaces of a plurality of holes. The conductive layer may be located either on an entirety or a part of the wall surfaces of the holes. The part of the conductive layer located on the wall surfaces of the plurality of holes and the part of the conductive layer located on at least one surface of the insulation layer may have a same thickness or different thicknesses, and may be made of a same material or different materials. A part of the conductive layer located on at least one surface of the insulation layer is partially or entirely connected to a part of the conductive layer located on the wall surfaces of the holes.

Protective Layer

The conductive layer of the current collector according to the present disclosure includes a first protective layer, and preferably a second protective layer.

When the thickness of the conductive layer is small, it is susceptible to chemical corrosion or mechanical damage. Therefore, the protective layer can enhance the mechanical strength of the current collector, and further improve the safety performance of the battery. In addition, the protective layer can effectively prevent the conductive layer from being oxidized, corroded or damaged, thereby significantly improving the long-term reliability and service life of the current collector.

For sake of illustration, in the embodiments of the present disclosure, when the protective layer is arranged on a surface of the conductive layer facing away from the insulation layer (i.e., the upper surface of the conductive layer), it is referred to as a first protective layer, and when the protective layer is arranged on a surface of the conductive layer facing towards the insulation layer (i.e., the lower surface of the conductive layer), it is referred to as a second protective layer.

The first protective layer is made of a metal. The metal is selected from a group consisting of nickel, chromium, nickel-based alloy, copper-based alloy (such as copper-nickel alloy), and combinations thereof. The conductive property of the metal material is better than that of the metal oxide or the conductive carbon. Further, the metal material may be selected from the metal nickel or the nickel-based alloy, because the metal nickel or the nickel-based alloy has good corrosion resistance, high hardness and good conductivity.

The second protective layer according to the embodiment of the present disclosure may be made of a metal, a metal oxide, or a conductive carbon. The metal may be preferably selected from a group consisting of nickel, chromium, nickel-based alloy, copper-based alloy (such as copper-nickel alloy), and combinations thereof. The metal oxide may be selected from a group consisting of aluminum oxide, cobalt oxide, chromium oxide, nickel oxide and combinations thereof. The conductive carbon may be selected from a group consisting of conductive carbon black, carbon nanotubes, or combinations thereof.

The nickel-chromium alloy is an alloy formed by a metal nickel and a metal chromium. Optionally, the mass ratio of nickel element to chromium element is 1:99 to 99:1. The copper-based alloy is an alloy formed by adding one or more other elements to a matrix of pure copper. The copper-based alloy is preferably a nickel-copper alloy. Optionally, in the nickel-copper alloy, the mass ratio of nickel element to copper element is 1:99 to 99:1.

Preferably, the second protective layer is also made of the metal.

As an improvement of the current collector according to the embodiments of the present disclosure, the first protective layer has a thickness of D3, which satisfies $D3 \leq 0.1D2$ and $1\ nm \leq D3 \leq 200\ nm$. That is, the thickness is smaller than or equal to $\frac{1}{10}D2$, and is within a range from 1 nm to 200 nm. The second protective layer has a thickness of D3', which satisfies $D3' \leq 0.1D2$ and $1\ nm \leq D3' \leq 200\ nm$.

The upper limit of the thickness D3/D3' of the protective layer may be 200 nm, 180 nm, 150 nm, 120 nm, 100 nm, 80 nm, 60 nm, 55 nm, 50 nm, 45 nm, 40 nm, 30 nm, or 20 nm. The lower limit of the thickness D3/D3' of the protective layer may be 1 nm, 2 nm, 5 nm, 8 nm, 10 nm, 12 nm, 15 nm, or 18 nm. The thickness D3/D3' of the protective layer can be in a range of consisting of any one upper limit and any one lower limit. If the protective layer is too thin, it is not enough to protect the conductive layer body; and if the protective layer is too thick, the weight energy density and volume energy density of the battery may be reduced. Preferably, $10\ nm \leq D3 \leq 50\ nm$. Preferably, $10\ nm \leq D3' \leq 50\ nm$.

From the thickness of the protective layer occupying the entire conductive layer, D3 satisfies $\frac{1}{2000}D2 \leq D3 \leq \frac{1}{10}D2$. That is, the thickness is in a range from $\frac{1}{2000}D2$ to $\frac{1}{10}D2$. More preferably, D3 satisfies $\frac{1}{1000}D2 \leq D3 \leq \frac{1}{10}D2$, $D3' $ satisfies $\frac{1}{2000}D2 \leq D3' \leq \frac{1}{10}D2$. That is, the thickness is in a range from $\frac{1}{2000}D2$ to $\frac{1}{10}D2$. More preferably, D'3 satisfies $\frac{1}{1000}D2 \leq D3' \leq \frac{1}{10}D2$.

As an improvement of the current collector according to the embodiments of the present disclosure, the thickness of the first protective layer is greater than that of the second protective layer. Preferably, $0.5D3 \leq D3' \leq 0.8D3$.

The protective layer can be formed on the conductive layer body by means of vapor deposition, an in-situ formation method, a coating method, or the like. With respect to the vapor deposition, physical vapor deposition (PVD) is preferable. Preferably, the physical vapor deposition is at least one of evaporation deposition and sputtering deposition. The evaporation deposition is preferably at least one of vacuum evaporating, thermal evaporation deposition, electron beam evaporation method (EBEM). As regards the sputtering deposition, magnetron sputtering is preferable. The in-situ formation method is preferably an in-situ passivation method, i.e., a method for in-situ forming a metal oxide passivation layer on a metal surface. The coating method is preferably one of roll coating, extrusion coating, blade coating, gravure coating, and the like.

The thickness of the first protective layer may be the same as or different from the thickness of the second protective layer.

The protective layer may be located only on one surface of the conductive layer or on two surfaces of the conductive layer. The protective layer may be disposed only on a planar portion of the current collector, or may be disposed on a planar portion of the current collector and on wall surfaces of a plurality of holes.

Figure 3:
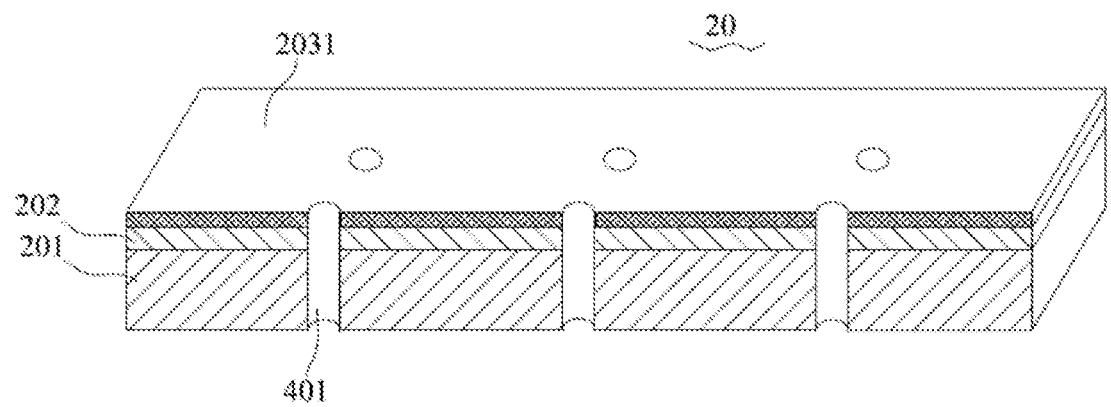
FIG. 3 is a three-dimensional section view of the negative current collector as shown in FIG. 1.
Figure 4:
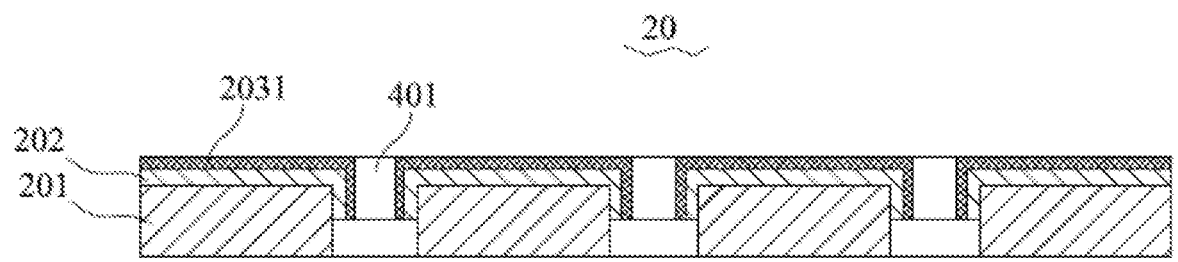
FIG. 4 is a schematic structural diagram of a negative current collector according to an embodiment of the present disclosure.
Figure 5:
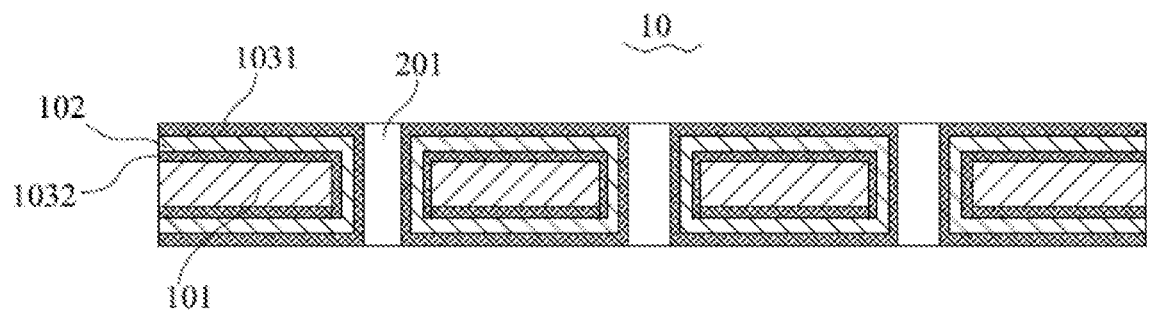
FIG. 5 is a schematic structural diagram of a positive current collector according to another embodiment of the present disclosure.
Figure 6:
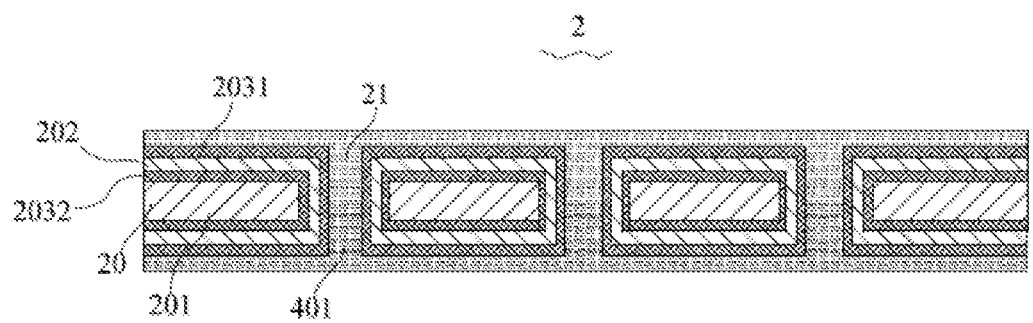
FIG. 6 is a schematic structural diagram of a negative electrode plate according to an embodiment of the present disclosure.
Figure 7:
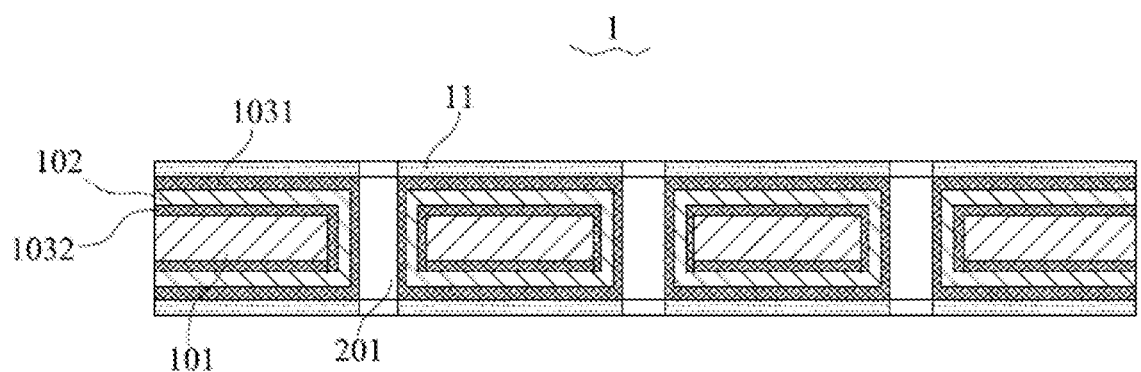
FIG. 7 is a schematic structural diagram of a positive electrode plate according to an embodiment of the present disclosure.

FIGS. 1-4 are schematic structural diagrams of negative current collectors according to the embodiments of the present disclosure, FIG. 5 is a schematic structural diagram of a positive current collector according to the embodiments of the present disclosure, FIG. 6 is a schematic structural diagram of a negative electrode plate according to the embodiments of the present disclosure, and FIG. 7 is a schematic structural diagram of a positive electrode plate according to the embodiments of the present disclosure.

Figure 2:
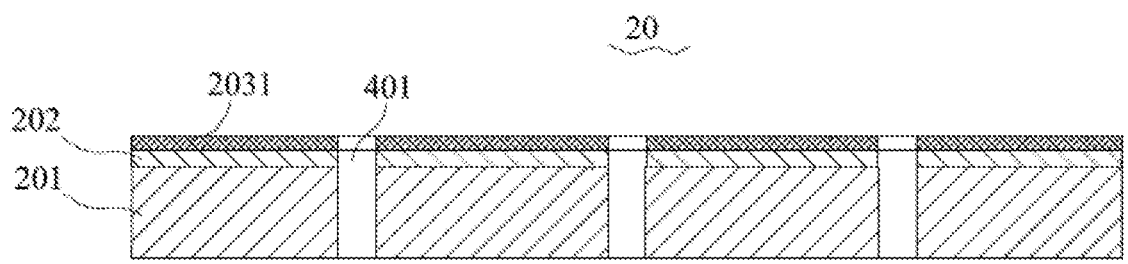
FIG. 2 is a section view of the negative current collector as shown in FIG. 1.

Referring to FIGS. 1-3, the negative current collector 20 includes a negative insulation layer 201, a first protective layer 2031 and a negative conductive layer 202 arranged between the negative insulation layer 201 and the first protective layer 2031. That is, the negative conductive layer 202 is provided on one surface of the negative insulation layer 201, and the first protective layer 2031 is provided on a surface of the negative conductive layer 202 facing away from the negative insulation layer 201. The negative current collector 20 is provided with a plurality of holes 401 penetrating through the negative insulation layer 201, the negative conductive layer 202 and the first protective layer 2031, and the negative conductive layer 202 is not formed on the wall surfaces of the holes 401.

In FIG. 4, the negative current collector 20 includes a negative insulation layer 201, a first protective layer 2031 and a negative conductive layer 202 arranged between the negative insulation layer 201 and the first protective layer 2031. That is, the negative conductive layer 202 is provided on one surface of the negative insulation layer 201, and the first protective layer 2031 is provided on a surface of the negative conductive layer 202 facing away from the negative insulation layer 201. The negative current collector 20 is provided with a plurality of holes 401 penetrating through the negative insulation layer 201, the negative conductive layer 202 and the first protective layer 2031, and the negative conductive layer 202 and the first protective layer 2031 are also located on a part of wall surfaces of the holes 401. Moreover, a part of the negative conductive layer 202 located on the negative insulation layer 201 is connected to a part of the negative conductive layer 202 located on the wall surfaces of the holes.

In FIG. 5, the positive current collector 10 includes a positive insulation layer 101, a positive conductive layer 102, a first protective layer 1031 and a second protective layer 1032. The positive conductive layer 102 is arranged on two opposite surfaces of the positive insulation layer 101. The first protective layer 1031 is provided on a surface of each positive conductive layer 102 facing away from the positive insulation layer 101. The second protective layer 1032 is provided on a surface of each positive conductive layer 102 facing towards the positive insulation layer 101. The positive current collector 10 is provided with a plurality of holes 201 penetrating through the positive insulation layer 101, the positive conductive layer 102, the first protective layer 1031 and the second protective layer 1032. The positive conductive layer 102, the first protective layer 1031 and the second protective layer 1032 are also located on all wall surfaces of the holes 201.

The second aspect of the present disclosure provides an electrode plate. The electrode plate includes the current collector according to the first aspect of the present disclosure and an electrode active material layer formed on a surface of the current collector.

FIG. 6 is a schematic structural diagram of a negative electrode plate according to an embodiment of the present disclosure. As shown in FIG. 6, the negative electrode plate 2 includes a negative current collector 20 and a negative active material layer 21 formed on surfaces of the negative current collector 20. The negative current collector 20 includes a negative insulation layer 201, a negative conductive layer 202, a first protective layer 2031 and a second protective layer 2032. The negative conductive layer 202 is provided on two opposite surfaces of the negative insulation layer 201. The first protective layer 2031 is provided on a surface of each negative conductive layer 202 facing away from the negative insulation layer 201. The second protective layer 2032 is provided on a surface of each negative conductive layer 202 facing towards the negative insulation layer 201. The negative current collector 20 is provided with a plurality of holes 401 penetrating through the negative insulation layer 201, the negative conductive layer 202, the first protective layer 2031, the second protective layer 2032 and the negative active material layer 21. The negative conductive layer 202, the first protective layer 2031 and the second protective layer 2032 are also located on all wall surfaces of the plurality of holes 401, and a part of the conductive layer 202 located on the insulation layer 201 is connected to a part of the conductive layer 202 located on the wall surfaces of the holes. The negative active material layer 21 is further filled into the plurality of holes 401.

FIG. 7 is a schematic structural diagram of a positive electrode plate according to an embodiment of the present disclosure. As shown in FIG. 7, the positive electrode plate 1 includes a positive current collector 10 and a positive active material layer 11 formed on surfaces of the positive current collector 10. The positive current collector 10 includes a positive insulation layer 101, a positive conductive layer 102, a first protective layer 1031 and a second protective layer 1032. The positive conductive layer 102 is arranged on two opposite surfaces of the positive insulation layer 101. The first protective layer 1031 is provided on a surface of each positive conductive layer 102 facing away from the positive insulation layer 101. The second protective layer 1032 is provided on a surface of each positive conductive layer 102 facing towards the positive insulation layer 101. The positive current collector 10 is provided with a plurality of holes 201 penetrating through the positive insulation layer 101, the positive conductive layer 102, the first protective layer 1031, the second protective layer 1032 and the positive active material layer 11. The positive conductive layer 102, the first protective layer 1031 and the second protective layer 1032 are also located on all wall surfaces of the holes 201.

It should be noted that FIGS. 1-7 are merely illustrative, and sizes, shapes and arrangements of the holes in the drawings are all illustrative.

It will be appreciated that when the conductive layer is arranged on both two opposite surfaces of the insulation layer, the current collector is coated with the active material on its two surfaces and the manufactured positive and negative electrode plates can be directly applied in the electrochemical device, and when the conductive layer is arranged on one surface of the insulation layer, the current collector is coated with the active material on its one surface and the manufactured negative electrode plates can be applied in the battery after being folded.

In an example, the electrode active material layer is formed on at least one surface of the current collector, and can be entirely or partially filled in the plurality of holes of the current collector. Moreover, the electrode active material layer formed on at least one surface of the current collector and the electrode active material layer filled in the plurality of holes of the current collector are connected to each other. In this way, the bonding force between the electrode active material layer and the current collector is stronger, and the long-term reliability and service life of the electrode plate and the battery can be improved. In addition, since the electrode active material layer has a certain porosity, such arrangement can have better electrolyte wettability and smaller polarization for the electrode plate.

The embodiments of the present disclosure also provide an electrochemical device. The electrochemical device includes a positive electrode plate, a separator and a negative electrode plate. The electrochemical device can be a wound type or a laminated type battery, such as one of a lithium ion secondary battery, a primary lithium battery, a sodium ion battery, or a magnesium ion battery. However, it is not limited to these batteries.

The positive electrode plate and/or the negative electrode plate are the electrode plate according to the above embodiments of the present disclosure.

EMBODIMENTS

1. Preparation of an insulation layer having a specific light transmittance

The insulation layer is made of PET. A certain amount of colorant carbon black is added to the PET and uniformly mixed therein. Then, the PET is subjected to extrusion casting, cold rolling, and biaxial stretching in a hot melt state to obtain an insulation layer having a specific light transmittance.

2. Preparation of Current Collector 2.1 An insulation layer having a certain thickness is selected, perforation is performed in the insulation layer to form holes, and then a conductive layer having a certain thickness is formed by means of vacuum evaporation in such a manner that the conductive layer is deposited on at least one surface of the insulation layer and the wall surfaces of the holes.

2.2 An insulation layer having a certain thickness is selected, a conductive layer having a certain thickness is formed by means of vacuum evaporation on a surface of the insulation layer, and then perforation is performed to form holes penetrating through the insulation layer and the conductive layer.

2.3 An insulation layer having a certain thickness is selected, perforation is performed to form holes, and then a conductive layer is deposited on the plane surface and the wall surfaces of the holes or on the wall surfaces of the holes and the plane surface.

The conditions of the vacuum evaporation for forming the conductive layer are as follows: the insulation layer is placed in a vacuum evaporation chamber after a surface cleaning treatment, a high-purity metal wire in a metal evaporation chamber is melted and evaporated at a high temperature in a range of 1600° C. to 2000° C., the evaporated metal passes through a cooling system in the vacuum evaporation chamber and is finally deposited on a surface of the insulation layer, so as to form the conductive layer.

3. Preparation of current collector having protective layer 3.1 Formation of first protective layer On a surface of a current collector having a conductive layer, a protective layer is formed on a surface of the conductive layer facing away from the insulation layer by means of vapor deposition, in-situ formation, or coating.

3.2 Formation of second protective layer

A protective layer is formed on a surface of the insulation layer by means of vapor deposition or coating, and then a conductive layer having a certain thickness is formed on the surface of the insulation layer having the protective layer disposed thereon by means of vacuum evaporation, so as to prepare a current collector having a second protective layer. In addition, on the basis of the above, a first protective layer may be further formed on an upper surface of the conductive layer.

It is possible to form the holes before or after formation of the protective layer(s).

In the embodiments of preparation, the vapor deposition is vacuum evaporation, the in-situ formation is in-situ passivation, and the coating is gravure coating.

The conditions of the vacuum evaporation are as follows: a sample is placed in a vacuum evaporation chamber after a surface cleaning treatment, a material of the protective layer in the evaporation chamber is melted and evaporated at a high temperature in a range of 1600° C. to 2000° C., and the evaporated material of the protective layer passes through a cooling system in the vacuum evaporation chamber and is finally deposited on a surface of the sample, so as to form the protective layer.

The conditions of the in-situ passivation are as follows: the conductive layer body is placed in a high-temperature oxidizing environment, the temperature is controlled within a range of 160° C. to 250° C., and the oxygen supply is maintained in the high-temperature environment, and processing time is 30 min, so as to form a protective layer of metal oxide.

The conditions of the gravure coating are as follows: a material of the protective layer and NMP are stirred and mixed, then the slurry of the above material of the protective layer (solid material content is 20% to 75%) is coated on a surface of the sample, the thickness of the coating is controlled by a gravure roll, and finally the coating is dried at 100 to 130° C.

4. Preparation of Electrode Plate

Positive slurry or negative slurry is coated on a surface of the current collector by a conventional coating process of battery and dried at 100° C., so as to obtain a positive electrode plate or a negative electrode plate.

Conventional positive electrode plate: current collector is an Al foil with a thickness of 12 μm, and the electrode active material layer is a ternary (NCM) material layer having a certain thickness.

Conventional negative electrode plate: current collector is a Cu foil with a thickness of 8 μm, and the electrode active material layer is a graphite layer with having a certain thickness.

In some embodiments, the electrode active material layer is disposed only in a planar portion of the current collector. In some embodiments, the electrode active material layer is disposed in a planar portion of the current collector and in the holes.

The specific parameters of the prepared current collector and its electrode plates are shown in Table 1. Parameters of the insulation layer, the conductive layer and the electrode active material parameters of the current collector of Electrode Plates 1 to 8 are shown in Table 1, in which the conductive layer is disposed on the upper surface and the lower surface of the insulation layer, and the conductive layer is formed by means of vacuum evaporation. "Surface only" means that the current collector is provided with a plurality of holes penetrating through the insulation layer and the conductive layer, and the conductive layer is disposed only on the upper surface and the lower surface of the insulation layer. "Surface and holes" means that the current collector is provided with a plurality of holes penetrating through the insulation layer and the conductive layer, the conductive layer is disposed not only on the upper surface and the lower surface of the insulation layer but also on all wall surfaces of the holes, and a part of the conductive layer formed on the wall surfaces of the holes is connected to a part of the conductive layer formed on the surface of the insulation layer. The holes are circular and have an aperture of 0.01 mm, the area ratio of the holes is selected to be 5%, and a spacing between two of the holes is 0.2 mm. The electrode active material is filled in a plurality of holes.

5. Preparation of Battery:

According to a conventional battery preparing process, a positive electrode plate (compaction density: 3.4 g/cm$^3$), a PP/PE/PP separator and a negative electrode plate (compaction density: 1.6 g/cm$^3$) together are winded to form a bare cell, then the bare cell is placed into a battery case, an electrolyte (EC:EMC in a volume ratio of 3:7, LiPF$_6$: 1 mol/L) is injected into the case, following by sealing, formation, and the like, so as to obtain a lithium-ion secondary battery.

Specific compositions of the batteries prepared in the embodiments of the present disclosure and the batteries of the Comparative Examples are shown in Table 1.

Experimental Examples:

1. Test Methods of Cycle Life of Battery:

A method for testing cycle life of the lithium-ion battery was performed as follows.

A lithium-ion battery was charged and discharged at 25° C. and 45° C., respectively, i.e., the battery was firstly charged with a current of 1C to a voltage of 4.2V, then was discharged with a current of 1C to a voltage of 2.8V, and the discharge capacity after a first cycle was recorded; and the battery was charged and discharged for 1000 cycles as above, and the discharge capacity of the battery after a 1000$^{th}$ cycle was recorded. A capacity retention rate after the 1000$^{th}$ cycle was obtained by dividing the discharge capacity after the 1000$^{th}$ cycle by the discharge capacity after the first cycle.

The experimental results are shown in Table 3.

2. Rate experiment

A rate experiment was performed for the lithium ion battery. The specific test method was performed as follows.

The lithium ion battery was charged and discharged at 25° C., i.e., the battery was firstly charged with a current of 1C to a voltage of 4.2V, and then was discharged with a current of 1C to a voltage of 2.8V. The discharge capacity after the first cycle was recorded and divided by the discharge capacity at 25° C. with 1C/1C charge-discharge after the first cycle to obtain a 4 C rate performance of the battery.

3. Test Methods of Bonding Force between Conductive Layer and Insulation Layer

The electrode plate was immersed in a mixed solvent of dimethyl carbonate and hydrofluoric acid, in which content of the hydrofluoric acid was 0.1 wt %, and then was vacuum-sealed and stored in a 70° C. incubator for several days. After the storage, the electrode plate was taken out, and folded in half along a length direction. At the same time, a 2 Kg weight was placed on the fold to compact it for 10 seconds. After the compaction, the electrode plate was flattened and then observed to see if the conductive layer peels off at the fold, and the number of days for which the electrode plate had been stored before the peeling off started to appear was recorded. The test results are shown in Table 4.

4. Test of Light Transmittance of Support Layer

The LS117 light transmittance meter was used to test a light transmittance of a support layer according to GB2410-80 standard. Firstly, the instrument was started up and self-calibrated, and then the interface displayed T=100%, i.e., calibration was OK. Then, the support layer sample was sandwiched between a probe and a receiver. The interface automatically displayed a value of the light transmittance of the support layer.

5. Test of Cutting Performance of Current Collector

The IPG's YLP-V2-1-100-100-100 fiber laser was adopted, for which the power was set to 100 W and the frequency was set to 150 kHz. The current collector was installed on a cutting device of the laser and then was cut, so as to measure the maximum cut-off speed of the current collector. The maximum cut-off speed of the current collector refers to the maximum cutting speed that can be achieved by laser cutting the current collector without adhesive bonding.

First, the technical effects of the first protective layer and the optional second protective layer will be described by embodiments.

TABLE 1

| Electrode plate No. | Current collector No. | Insulation layer Material | D1 | Conductive layer Material | D2 | Thickness of current collector | Weight percent of current collector |
|---|---|---|---|---|---|---|---|
| Positive Electrode plate 1 | Positive current collector 1 | PI | 6 μm | Al | 300 nm | 6.6 μm | 30.0% |
| Positive Electrode plate 2 | Positive current collector 2 | PET | 4 μm | Al | 500 nm | 5 μm | 24.3% |
| Positive Electrode plate 3 | Positive current collector 3 | PET | 2 μm | Al | 200 nm | 2.4 μm | 11.3% |
| Conventional Positive electrode plate | Conventional positive current collector | / | / | Al | / | 12 μm | 100% |
| Negative Electrode plate 1 | Negative current collector 1 | PET | 5 μm | Cu | 500 nm | 6 μm | 21.6% |
| Negative Electrode plate 2 | Negative current collector 2 | PI | 2 μm | Cu | 800 nm | 3.6 μm | 23.8% |
| Negative Electrode plate 3 | Negative current collector 3 | PET | 8 μm | Cu | 1 μm | 10 μm | 39.6% |
| Negative electrode plate 4 | Negative current collector 4 | PET | 6 μm | Cu | 1.5 μm | 9 μm | 48.5% |
| Negative electrode plate 5 | Negative current collector 5 | PET | 4 μm | Cu | 1.2 μm | 6.4 μm | 37.3% |
| Negative electrode plate 6 | Negative current collector 6 | PET | 10 μm | Cu | 200 nm | 10.4 μm | 23.3% |
| Conventional negative electrode plate | Conventional negative current collector | / | / | Cu | / | 8 μm | 100% |

TABLE 2

| Electrode plate No. | Current collector No. | Second protective layer Material | D3' | First protective layer Material | D3 |
|---|---|---|---|---|---|
| Negative electrode plate 4-1 | Negative current collector 4-1 | / | / | Nickel | 1 nm |
| Negative electrode plate 4-2 | Negative current collector 4-2 | / | / | Nickel | 10 nm |
| Negative electrode plate 4-3 | Negative current collector 4-3 | / | / | Nickel-based alloy | 50 nm |
| Negative electrode plate 4-4 | Negative current collector 4-4 | / | / | Nickel | 150 nm |
| Negative electrode plate 4-5 | Negative current collector 4-5 | Nickel | 5 nm | Nickel | 10 nm |
| Negative electrode plate 4-6 | Negative current collector 4-6 | Nickel | 10 nm | Nickel | 20 nm |

TABLE 2-continued

| Electrode plate No. | Current collector No. | Second protective layer Material | D3' | First protective layer Material | D3 |
|---|---|---|---|---|---|
| Negative electrode plate 4-7 | Negative current collector 4-7 | Nickel | 40 nm | Nickel | 50 nm |
| Negative electrode plate 4-8 | Negative current collector 4-8 | Nickel | 50 nm | Nickel | 100 nm |
| Negative electrode plate 4-9 | Negative current collector 4-9 | Nickel | 100 nm | Nickel | 150 nm |

"/" indicates that no protective layer is provided. The nickel-based alloy is an alloy formed by nickel and chromium in a mass ratio of 9:1.

TABLE 3

| Battery No. | Composition of the electrode plate | |
|---|---|---|
| Battery 1 | Conventional negative electrode plate | Conventional positive electrode plate |
| Battery 2 | Conventional negative electrode plate | Positive electrode plate 1 |
| Battery 3 | Negative electrode plate 1 | Conventional positive electrode plate |
| Battery 4 | Negative electrode plate 2 | Conventional positive electrode plate |
| Battery 5 | Negative electrode plate 3 | Conventional positive electrode plate |
| Battery 6 | Negative electrode plate 4 | Conventional positive electrode plate |
| Battery 7 | Negative electrode plate 5 | Conventional positive electrode plate |
| Battery 8 | Negative electrode plate 6 | Conventional positive electrode plate |
| Battery 9 | Negative electrode plate 4-1 | Conventional positive electrode plate |
| Battery 10 | Negative electrode plate 4-2 | Conventional positive electrode plate |
| Battery 11 | Negative electrode plate 4-3 | Conventional positive electrode plate |
| Battery 12 | Negative electrode plate 4-4 | Conventional positive electrode plate |
| Battery 13 | Negative electrode plate 4-5 | Conventional positive electrode plate |
| Battery 14 | Negative electrode plate 4-6 | Conventional positive electrode plate |
| Battery 15 | Negative electrode plate 4-7 | Conventional positive electrode plate |
| Battery 16 | Negative electrode plate 4-8 | Conventional positive electrode plate |
| Battery 17 | Negative electrode plate 4-9 | Conventional positive electrode plate |

TABLE 4

| Battery No. | Capacity retention ratio after the $1000^{th}$ cycle at 45° C. | 4 C rate performance |
|---|---|---|
| Battery 1 | 85.3% | 45.2% |
| Battery 2 | 85.4% | 45.4% |
| Battery 3 | 85.7% | 45.5% |
| Battery 4 | 85.9% | 46.0% |
| Battery 5 | 86.1% | 46.3% |
| Battery 6 | 86.4% | 46.8% |
| Battery 7 | 86.2% | 46.2% |
| Battery 8 | 85.0% | 45.7% |
| Battery 9 | 86.3% | 46.5% |
| Battery 10 | 86.8% | 46.6% |
| Battery 11 | 86.9% | 46.8% |
| Battery 12 | 87.1% | 47.5% |
| Battery 13 | 87.4% | 47.4% |
| Battery 14 | 87.6% | 47.5% |
| Battery 15 | 87.9% | 47.8% |
| Battery 16 | 88.0% | 48.1% |
| Battery 17 | 88.3% | 48.7% |

It can be seen from Tables 1 and 2 that the weights of the positive electrode collector and the negative current collector adopting the present disclosure are greatly reduced. The weight percentage of the positive current collector is 30% or smaller of the conventional positive current collector, and the weight percentage of the negative current collector is 50% or smaller of the conventional negative current collector. According to the weight percentages of the comparative negative electrode electrodes, when the thickness of the conductive layer is greater than 1.5 μm, the effect of reducing the weight of the current collector is limited, and the overall thickness of the current collector cannot be effectively reduced. Although the thicknesses of the negative current collector 3 and the negative current collector 4 were not reduced, their weights were greatly reduced. The thicknesses and weights of the negative current collector 1, the negative current collector 2, and the negative current collector 5 are all reduced, so that both the volume energy density and the weight energy density of the battery can be increased.

According to the results in Table 4, the battery prepared by the current collector provided with the protective layer can have a further improved capacity retention rate compared with a current collector not provided with a protective layer, indicating a better reliability of the battery.

TABLE 5

| Electrode Plate No. | Insulation Layer Material | D1 | Conductive Layer Material | D2 | With or without holes | Protective Layer | States of holes | Electrode active material layer Material | Thickness |
|---|---|---|---|---|---|---|---|---|---|
| Negative Electrode Plate 3-1 | PET | 8 μm | Cu | 1 μm | Without holes | Yes | / | Graphite | 70 μm |

TABLE 5-continued

| Electrode Plate No. | Insulation Layer Material | D1 | Conductive Layer Material | D2 | With or without holes | Protective Layer | States of holes | Electrode active material layer Material | Thickness |
|---|---|---|---|---|---|---|---|---|---|
| Negative Electrode Plate 3-2 | PET | 8 μm | Cu | 1 μm | With holes | Yes | Surface only | Graphite | 70 μm |
| Negative Electrode Plate 3-3 | PET | 8 μm | Cu | 1 μm | With holes | Yes | Surface and holes | Graphite | 70 μm |

TABLE 6

| Electrode Plate No. | Number of Days |
|---|---|
| Negative Electrode Plate 3-1 | 10 |
| Negative Electrode Plate 3-2 | 20 |
| Negative Electrode Plate 3-3 | >30 |

It can be seen from the results in Table 6 that in the composite current collector having holes, the bonding force between the conductive layer and the insulation layer is significantly enhanced with respect to the composite current collector without holes. In particular, when the conductive layer is disposed on the surface of the insulation layer and the wall surfaces of the plurality of holes, the conductive layer firmly "grips" the insulation layer from at least one surface of the insulation layer and the plurality of holes. The bonding between the insulation layer and the conductive layer is not limited to the plane direction, but also applies in the depth direction, which can strengthen the bonding force between the conductive layer and the insulation layer, thereby improving the long-term reliability and service life of the current collector.

The examples will be exemplified below to illustrate the effect of light transmittance on the laser processability of the insulation layer. Here, a current collector without holes is used for explanation, referring to Table 7.

It can be seen that, in the case where the thickness of the insulation layer is the same, reducing the light transmittance of the insulation layer can significantly increase the cutting speed of the current collector under the low-power laser cutting processing without causing adhesive bonding, so that the cutting performance and cutting rate of the current collector during the laser cutting processing can be significantly improved.

The preferable embodiments of the present disclosure are disclosed above but are not used to limit the claims. Those skilled in the art may make possible changes and modifications without departing from the concept of the present disclosure. Therefore, the protection scope of the present disclosure is defined by the attached claims.

What is claimed is:

1. A current collector, comprising
an insulation layer;
a conductive layer at least located on at least one surface of the insulation layer;
a first protective layer provided on a surface of the conductive layer facing away from the insulation layer; and
a second protective layer provided on a surface of the conductive layer facing towards the insulation layer,
wherein the current collector is provided with a plurality of holes penetrating through the current collector, and

TABLE 7

| No. | Conductive Layer Material | D2 μm | Insulation Layer Material | D1 μm | Colorant | light transmittance % | With or without holes | Maximum cut-off speed m/min |
|---|---|---|---|---|---|---|---|---|
| Current Collector 11 | Al | 0.03 | PET | 1 | carbon black | 98 | Without holes | 30 |
| Current Collector 12 | Al | 0.3 | PET | 6 | carbon black | 92 | Without holes | 36 |
| Current Collector 13 | Al | 1 | PET | 6 | carbon black | 87 | Without holes | 50 |
| Current Collector 14 | Al | 1 | PET | 10 | carbon black | 96 | Without holes | 20 |
| Current Collector 15 | Al | 1 | PET | 10 | cadmium red | 55 | Without holes | 80 |
| Current Collector 16 | Al | 1.5 | PET | 15 | cobalt blue | 80 | Without holes | 30 |
| Current Collector 17 | Al | 2 | PET | 15 | carbon black | 54 | Without holes | 60 |
| Current Collector 18 | Al | 2 | PET | 20 | carbon black | 45 | Without holes | 55 |
| Current Collector 19 | Al | 3 | PET | 30 | carbon black | 40 | Without holes | 50 |
| Current Collector 20 | Al | 0.03 | PET | 30 | carbon black | 40 | Without holes | 55 |
| Comparative Current Collector | Al | 1 | PET | 10 | / | 100 | Without holes | 15 | wherein the first protective layer has a thickness of D3, the second protective layer has a thickness of D3', and D3 and D3' satisfy 0.5D3≤D3'≤0.8D3.

2. The current collector according to claim 1, wherein the conductive layer is further arranged on wall surfaces of the plurality of holes, and a part of the conductive layer located on the at least one surface of the insulation layer is partially or entirely connected to a part of the conductive layer located on the wall surfaces of the plurality of holes; each of the plurality of holes has an aperture in a range from 0.001 mm to 3 mm, an area ratio of the plurality of holes to an entire surface of the conductive layer located on one surface of the insulation layer is 0.1% to 30%, and two adjacent holes of the plurality of holes have a spacing in a range from 0.2 mm to 5 mm with respect to each other.

3. The current collector according to claim 1, wherein the conductive layer has a thickness of D2, where 30 nm≤D2≤3 μm.

4. The current collector according to claim 1, wherein the metal is selected from a group consisting of nickel, chromium, nickel-based alloy, copper-based alloy, and combinations thereof.

5. The current collector according to claim 1, wherein the second protective layer is made of a metal, a metal oxide, or a conductive carbon, wherein the metal is selected from a group consisting of nickel, chromium, nickel-based alloy, copper-based alloy and combinations thereof, the metal oxide is selected from a group consisting of aluminum oxide, cobalt oxide, chromium oxide, nickel oxide and combinations thereof, and the conductive carbon is selected from a group consisting of conductive carbon black, carbon nanotubes, acetylene black, graphene and combinations thereof.

6. The current collector according to claim 5, wherein the conductive layer has a thickness of D2,
wherein D3≤0.1D2 and 1 nm≤D3≤200 nm, and
wherein D3'≤0.1D2 and 1 nm≤D3'≤200 nm.

7. The current collector according to claim 1, wherein the insulation layer is added with a colorant for adjusting a light transmittance T of the insulation layer, and the light transmittance T of the insulation layer satisfies: 0≤T≤98%.

8. An electrode plate, comprising the current collector according to claim 1 and an electrode active material layer at least formed on at least one surface of the current collector.

9. The electrode plate according to claim 8, wherein the electrode active material layer is further filled in the plurality of holes, and
a part of the electrode active material layer formed on the current collector is partially or entirely connected to a part of the electrode active material layer filled in the plurality of holes.

10. An electrochemical device, comprising a positive electrode plate, a separator, and a negative electrode plate, wherein the positive electrode plate and/or the negative electrode plate is the electrode plate according to claim 8.

11. The current collector according to claim 2, wherein the at least one surface of the insulation layer comprises an upper surface and a lower surface of the insulation layer, and a part of the conductive layer located on the upper surface and the lower surface of the insulation layer is partially or entirely connected to the part of the conductive layer located on the wall surfaces of the plurality of holes.

12. The current collector according to claim 3, wherein D2 satisfies 300 D2≤2 μm.

13. The current collector according to claim 12, wherein D2 satisfies 500 nm≤D2≤1.5 μm.

14. The current collector according to claim 5, wherein the second protective layer is preferably made of the metal.

15. The current collector according to claim 6, wherein D3 satisfies 10 nm≤D3≤50 nm.

16. The current collector according to claim 6, wherein D3' satisfies 10 nm≤D3'≤50 nm.

17. The current collector according to claim 7, wherein the light transmittance T of the insulation layer satisfies 15%≤T≤95%.

18. The current collector according to claim 17, wherein the light transmittance T of the insulation layer satisfies 15%≤T≤90%.

* * * * *